United States Patent
Yamanaka et al.

(10) Patent No.: US 9,475,935 B2
(45) Date of Patent: Oct. 25, 2016

(54) DRIPPING INHIBITOR AND RESIN COMPOUND

(75) Inventors: Taku Yamanaka, Settsu (JP); Masayoshi Miyamoto, Settsu (JP); Shunji Kasai, Settsu (JP); Masayuki Tsuji, Settsu (JP); Kazuya Kawahara, Settsu (JP); Mayumi Yamauchi, Minato-ku (JP); Taketo Kato, Settsu (JP); Yasuhiko Sawada, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 13/877,034

(22) PCT Filed: Sep. 29, 2011

(86) PCT No.: PCT/JP2011/072446
§ 371 (c)(1),
(2), (4) Date: Mar. 29, 2013

(87) PCT Pub. No.: WO2012/043754
PCT Pub. Date: Apr. 5, 2012

(65) Prior Publication Data
US 2013/0184395 A1 Jul. 18, 2013

(30) Foreign Application Priority Data
Sep. 30, 2010 (JP) .................................. 2010-223148

(51) Int. Cl.
*C08L 27/18* (2006.01)
*C08L 69/00* (2006.01)
(Continued)

(52) U.S. Cl.
CPC .............. *C08L 69/00* (2013.01); *C08F 214/26* (2013.01); *C08J 3/16* (2013.01); *C08J 3/203* (2013.01); *C08L 27/18* (2013.01); *C08L 27/22* (2013.01);
(Continued)

(58) Field of Classification Search
USPC .................. 524/545, 502; 428/402; 525/185
See application file for complete search history.

(56) References Cited

U.S. PATENT DOCUMENTS 2,075,628 A 3/1937 Sekavec
2,593,583 A 4/1952 Lontz
(Continued)

FOREIGN PATENT DOCUMENTS

CA 1045269 12/1978
EP 0 861 856 A1 9/1998
(Continued)

OTHER PUBLICATIONS

International Preliminary Report on Patentability, together with the Written Opinion of the International Searching Authority, for PCT/JP2011/072446.

(Continued)

*Primary Examiner* — Peter D Mulcahy
*Assistant Examiner* — Henry Hu
(74) *Attorney, Agent, or Firm* — Sughrue Mion, PLLC

(57) ABSTRACT

Provided is a dripping inhibitor excellent in handling characteristics. The present invention provides a dripping inhibitor including a modified polytetrafluoroethylene, the inhibitor having an average particle size of 300 to 800 μm, an apparent density of 0.40 to 0.52 g/ml, a compression ratio of 1.20 or less, an aggregate disintegration degree with 50-sec vibration of 70% or more, a cylinder extrusion pressure at a reduction ratio 1500 of 80 MPa or less, and a standard specific gravity (SSG) of 2.140 to 2.230.

1 Claim, 3 Drawing Sheets

(51) Int. Cl.
*C08F 214/26* (2006.01)
*C08L 67/02* (2006.01)
*C08J 3/16* (2006.01)
*C08J 3/20* (2006.01)
*C08L 27/22* (2006.01)

(52) U.S. Cl.
CPC ............ *C08L 67/02* (2013.01); *C08J 2327/18* (2013.01); *C08J 2369/00* (2013.01); *C08J 2427/18* (2013.01); *Y10T 428/2982* (2015.01)

(56) References Cited

U.S. PATENT DOCUMENTS

| | | | |
|---|---|---|---|
| 4,107,232 A | 8/1978 | Haaf et al. | |
| 4,355,126 A | 10/1982 | Haaf et al. | |
| 4,368,296 A | 1/1983 | Kuhls et al. | |
| 4,391,935 A | 7/1983 | Bialous et al. | |
| 4,408,007 A | 10/1983 | Kuhls et al. | |
| 4,649,168 A | 3/1987 | Kress et al. | |
| 4,751,260 A | 6/1988 | Kress et al. | |
| 4,767,821 A | 8/1988 | Lindner et al. | |
| 4,810,739 A | 3/1989 | Lindner et al. | |
| 4,920,166 A | 4/1990 | Buysch et al. | |
| 4,983,658 A | 1/1991 | Kress et al. | |
| 4,999,115 A | 3/1991 | Peterson | |
| 5,061,745 A | 10/1991 | Wittmann et al. | |
| 5,242,960 A | 9/1993 | Ostlinning et al. | |
| 5,804,654 A | 9/1998 | Lo et al. | |
| 6,300,408 B1 | 10/2001 | Asano et al. | |
| 6,422,736 B1 | 7/2002 | Antoniades et al. | |
| 6,503,988 B1 * | 1/2003 | Kitahara et al. | 525/326.2 |
| 7,220,456 B2 | 5/2007 | Mehta et al. | |
| 2006/0173100 A1 | 8/2006 | Lee et al. | |
| 2006/0252898 A1 | 11/2006 | Tsuji et al. | |
| 2008/0020159 A1 | 1/2008 | Taira et al. | |
| 2008/0275188 A1 | 11/2008 | Park | |
| 2009/0011351 A1 | 1/2009 | Kikawa et al. | |
| 2011/0021728 A1 * | 1/2011 | Higuchi | C08F 2/22 526/247 |
| 2011/0040054 A1 * | 2/2011 | Higuchi | C08F 6/18 526/255 |
| 2011/0105649 A1 * | 5/2011 | Harada et al. | 524/30 |
| 2011/0196080 A1 * | 8/2011 | Matsuoka et al. | 524/210 |
| 2011/0201730 A1 * | 8/2011 | Tsunoda et al. | 524/100 |
| 2013/0122302 A1 | 5/2013 | Miyamoto et al. | |
| 2013/0184401 A1 | 7/2013 | Miyamoto et al. | |
| 2014/0336315 A1 | 11/2014 | Yamanaka et al. | |

FOREIGN PATENT DOCUMENTS

| | | |
|---|---|---|
| EP | 1 702 932 A1 | 9/2006 |
| EP | 2 623 543 A1 | 8/2013 |
| EP | 2623556 A1 * | 8/2013 |
| GB | 1 459 648 | 12/1976 |
| JP | 49-115190 A | 11/1974 |
| JP | 50-44241 | 4/1975 |
| JP | 56-131629 A | 10/1981 |
| JP | 59-36657 B2 | 9/1984 |
| JP | 60-38418 B2 | 8/1985 |
| JP | 60-258263 A | 12/1985 |
| JP | 61-55145 A | 3/1986 |
| JP | 61-127759 A | 6/1986 |
| JP | 61-261352 A | 11/1986 |
| JP | 62-58629 B2 | 12/1987 |
| JP | 63-278961 A | 11/1988 |
| JP | 1-60181 B2 | 12/1989 |
| JP | 2-32154 A | 2/1990 |
| JP | 5-186686 A | 7/1993 |
| JP | 5-214184 A | 8/1993 |
| JP | 5-287151 A | 11/1993 |
| JP | 6-306212 A | 11/1994 |
| JP | 7-324147 A | 12/1995 |
| JP | 8-253600 A | 10/1996 |
| JP | 9-95583 A | 4/1997 |
| JP | 10-77378 A | 3/1998 |
| JP | H10-147617 A | 6/1998 |
| JP | 10-259252 A | 9/1998 |
| JP | 10-310707 A | 11/1998 |
| JP | 2005-2322 A | 1/2005 |
| WO | 97/17382 A1 | 5/1997 |
| WO | 2004/074371 A1 | 9/2004 |
| WO | 2006/054612 A1 | 5/2006 |
| WO | 2007/046377 A1 | 4/2007 |
| WO | 2007/049517 A1 | 5/2007 |
| WO | 2009/128432 A1 | 10/2009 |
| WO | WO-2009/128432 A1 * | 10/2009 |
| WO | 2009/142080 A1 | 11/2009 |
| WO | WO-2009/142080 A1 * | 11/2009 |
| WO | 2011/055824 A1 | 5/2011 |

OTHER PUBLICATIONS

International Preliminary Report on Patentability, together with the Written Opinion of the International Searching Authority, for PCT/JP2011/072453.
International Preliminary Report on Patentability, together with the Written Opinion of the International Searching Authority, for PCT/JP2011/073039.
International Search Report with a mailing date of Dec. 13, 2011 for PCT/JP2011/073039.
International Search Report with a mailing date of Jan. 10, 2012 for PCT/JP2011/072453.
Extended European Search Report dated Mar. 2, 2015, issued by the European Patent Office in counterpart European Application No. 11829431.3, which is a counterpart of related U.S. Appl. No. 13/810,323 (published as U.S. Pat. No. 2013/0122302).
Non-Final Office Action dated Oct. 17, 2014, issued by the United States Patent and Trademark Office in related U.S. Appl. No. 13/810,323.

* cited by examiner (a)

(b)

(c)

(d)

DRIPPING INHIBITOR AND RESIN COMPOUND

CROSS REFERENCE TO RELATED APPLICATIONS

This application is a National Stage of International Application No. PCT/JP2011/072446, filed on Sep. 29, 2011, which claims priority from Japanese Patent Application No. 2010-223148, filed on Sep. 30, 2010, the contents of all of which are incorporated herein by reference in their entirety.

TECHNICAL FIELD

The present invention relates to a dripping inhibitor and a resin compound.

BACKGROUND ART

Conventional molded products of thermoplastic resin for applications such as electric appliances and OA equipment used at home, in offices, in plants, and the like mostly contain flammable thermoplastic resin. Therefore, molding materials of these products are generally required to contain a flame retardant for improving flame retardance of resin products.

Although many flame retardants have incombustibility, once combustion starts, they can hardly inhibit the spread of the combustion because thermoplastic resin becomes liquid and then drips with burning. Concerning incombustibility, for example, Underwriters' Laboratories (hereinafter abbreviated as UL) provide classes of Fire Test in standard 94, which include a class of high incombustibility (V-1, V-0) with anti-dripping property. In some cases, a polytetrafluoroethylene (PTFE) powder or an aqueous dispersion thereof along with a flame retardant are added to and melt mixed with a flammable thermoplastic resin so as to inhibit dripping and further improve safety.

PTFE is excellent in heat resistance, chemical resistance, and electrical insulation, and has specific surface characteristics such as water and oil repellency, anti-adhesion, and self-lubricating property. With these advantageous properties, PTFE is widely used for coating agents. Since PTFE is highly crystalline and has low intermolecular force, it can be made into fibers with a little stress. In addition, PTFE improves formability, mechanical properties, and the like when added to a thermoplastic resin. Thus, PTFE is also used for additives for thermoplastic resins.

For example, Patent Literature 1 discloses a compound which contains 0.1 to 5% (% by weight; the same shall apply hereinafter) of PTFE with a flammable thermoplastic resin, a flame retardant, and an incombustible fiber; Patent Literature 2 discloses a compound which contains a flame retardant and PTFE with a polyphenylene ether resin or styrene resin; Patent Literature 3 discloses a compound which contains 0.01 to 10% of a flame retardant of an organic alkali metal salt and/or organic alkaline earth metal salt and 0.01 to 2.0% of PTFE (ASTM D-1457, Type III) with an aromatic polycarbonate; and Patent Literature 4 discloses a compound which contains a flame retardant and PTFE with an acrylonitrile-butadiene-styrene copolymer (ABS).

As examples of polymer alloys of an aromatic polycarbonate and styrene resin, Patent Literature 5 discloses a compound which contains PTFE, an organobromine compound, and a flame retardant such as an antimony compound or a bismuth compound; Patent Literatures 6 to 9 disclose compounds which contain PTFE with a phosphorous compound; and Patent Literature 10 discloses a compound which contains PTFE with an alkali metal salt of an organic or inorganic acid. As an example of polyamides, Patent Literature 11 discloses a compound which contains PTFE with a flame retardant such as a phosphate ester. Patent Literatures 12 and 13 disclose resin compounds which contains polytetrafluoroethylene with polyolefin. Patent Literature 14 discloses a method of producing a polyolefin resin compound by mixing polytetrafluoroethylene and dispersion medium powder with a high shear force, making polytetrafluoroethylene into fibers, and then mixing the resulting fibers with polyolefin.

Examples of PTFE for anti-drip applications include a powder (generally called as a PTFE fine powder, standard specific gravity (SSG): 2.14 to 2.23, classified to ASTM D-1457, Type III) produced by coagulation and drying from a latex which is prepared by emulsion polymerization of tetrafluoroethylene (TFE); and an aqueous dispersion (generally called as PTFE dispersion) produced by adding a surfactant to the latex, and condensing and stabilizing the mixture.

The anti-drip function relies on PTFE particles of having tendency to fibrillate. Specifically, when a thermoplastic resin in a molten state is mixed with the fine powder or the dispersion, PTFE fine particles fibrillate by a shear force of mixing, and the fibrils are dispersed in the thermoplastic resin. The dispersed fibrils remain in final molded products of the thermoplastic resin, which inhibits dripping during combustion.

Before melt mixing of the flammable thermoplastic resin and PTFE, the flammable thermoplastic resin, which is in a state of powder, pellet, or liquid and the fine powder or the dispersion need to be premixed. The fine powder, however, has inferior handling characteristics because it tends to fibrillate even at normal temperature and easily aggregate. Thus, workability at mixing can be a serious problem. As for the dispersion, when the flammable thermoplastic resin is prepared as an aqueous dispersion, the PTFE dispersion may be easily mixed with the thermoplastic resin. In contrast, when the thermoplastic resin is in the form of powder or pellets, the PTFE dispersion is required to be subjected to a step of removing unnecessary water and surfactants in the dispersion.

There is a requirement for a PTFE dripping inhibitor excellent in handling characteristics of powder. Such inhibitor, however, has another problem. Specifically, before a PTFE dripping inhibitor is added to a raw resin, a PTFE powder and the raw resin need to be premixed. During the premix, the mixed powder of the raw resin and PTFE aggregates to cause blocking in a mixing machine or a feeder of an extruder, which significantly reduces workability and productivity.

In order to solve these problems, Patent Literatures 15 to 17 and the like disclose attempts to improve flame retardance of thermoplastic resin compounds by addition of a mixture of PTFE particles and organic polymer particles (a powder mixture containing PTFE). Patent Literature 15 discloses that the flame retardance can be improved by adding a powder coagulated in a mixture of a polytetrafluoroethylene dispersion liquid and an aromatic vinyl polymer dispersion liquid. Patent Literature 16 discloses that a powder having excellent handling characteristics can be produced by polymerizing an organic monomer in the presence of a polytetrafluoroethylene dispersion liquid. Patent Literature 17 discloses that a thermoplastic resin compound excellent in flame retardance and impact resistance can be formed from a polycarbonate, an acrylonitrile-styrene-butadiene copolymer, and a polyorganosiloxane containing a composite rubber graft copolymer.

However, when a certain amount of a powder mixture containing PTFE is added as a dripping inhibitor to a thermoplastic resin, the powder mixture containing PTFE produces less anti-dripping effect compared with the case of using the same amount of a dripping inhibitor consisting solely of PTFE. This is because the amount of PTFE contributing to anti-dripping ability is less than that of the dripping inhibitor consisting solely of PTFE. Accordingly, more amount of the dripping inhibitor is required to achieve sufficient effect, which raises the cost.

There is another proposal of using a PTFE molding powder (standard specific gravity: 2.13 to 2.23, classified to ASTM D-1457, type IV, VI, or VII) manufactured by suspension polymerization of TFE as an additive agent for a flammable thermoplastic resin (for example, refer to Patent Literature 18).

Patent Literature 19 also proposes a method of producing a PTFE fine powder from a PTFE latex, which has excellent powder flowability and a high apparent density of at least 0.52 g/ml, by coagulation from the PTFE latex which is preliminarily blended with a large amount of a fluorosurfactant.

CITATION LIST

Patent Literature

Patent Literature 1: JP 50-44241 A
Patent Literature 2: JP 59-36657 B
Patent Literature 3: JP 60-38418 B
Patent Literature 4: JP 62-58629 B
Patent Literature 5: JP 1-60181 B
Patent Literature 6: JP 61-55145 A
Patent Literature 7: JP 61-261352 A
Patent Literature 8: JP 63-278961 A
Patent Literature 9: JP 2-32154 A
Patent Literature 10: JP 61-127759 A
Patent Literature 11: JP 5-186686 A
Patent Literature 12: JP 5-214184 A
Patent Literature 13: JP 6-306212 A
Patent Literature 14: JP 7-324147 A
Patent Literature 15: JP 60-258263 A
Patent Literature 16: JP 9-95583 A
Patent Literature 17: JP 10-310707 A
Patent Literature 18: JP 10-77378 A
Patent Literature 19: WO 97/17382 A

SUMMARY OF INVENTION

Technical Problem

Conventional dripping inhibitors including a PTFE fine powder, however, still tend to aggregate and handling characteristics of those have not reached a satisfactory level.

For example, Patent Literature 18 discloses that PTFE molding powders generally tend not to fibrillate, which allows excellent handling characteristics of the powders. Thus, when such a powder and a flammable thermoplastic resin in a molten state are kneaded under a shear force, the PTFE powder fibrillates and gives anti-dripping ability. There are problems, however, that white spots tend to be formed which are residues of the PTFE powder remaining non-fibrillated on the surface of molded products, and that sufficient anti-drip effect cannot be easily achieved. Patent Literature 19 also had a similar problem to that of Patent Literature 18, that white spots tend to be formed which are residues of the PTFE powder remaining non-fibrillated on the surface of molded products.

The present invention aims to provide a dripping inhibitor excellent in handling characteristics. The present invention also provides a resin compound including the dripping inhibitor.

Solution to Problem

The present invention provides a dripping inhibitor including a modified polytetrafluoroethylene, the inhibitor having an average particle size of 300 to 800 μm, an apparent density of 0.40 to 0.52 g/ml, a compression ratio of 1.20 or less, an aggregate disintegration degree with 50-sec vibration of 70% or more, a cylinder extrusion pressure at a RR (Reduction Ratio) of 1500 of 80 MPa or less, and a standard specific gravity (SSG) of 2.140 to 2.230.

The present invention also provides a resin compound including the dripping inhibitor and a thermoplastic resin.

The thermoplastic resin is preferably at least one selected from the group consisting of polycarbonates, acrylonitrile-styrene resins, acrylonitrile-butadiene-styrene resins, (polycarbonate)/(acrylonitrile-butadiene-styrene)alloy resins, polybutylene terephthalate, polyethylene terephthalate, polyphenylene ether, polypropylene, and polystyrene.

The thermoplastic resin is preferably a polycarbonate.

The resin compound of the present invention preferably further includes a flame retardant.

Advantageous Effects of Invention

Since the dripping inhibitor of the present invention has the above features, it has excellent handling characteristics. Since the resin compound of the present invention includes the dripping inhibitor, it also has excellent handling characteristics.

DESCRIPTION OF EMBODIMENTS

Figure 1:
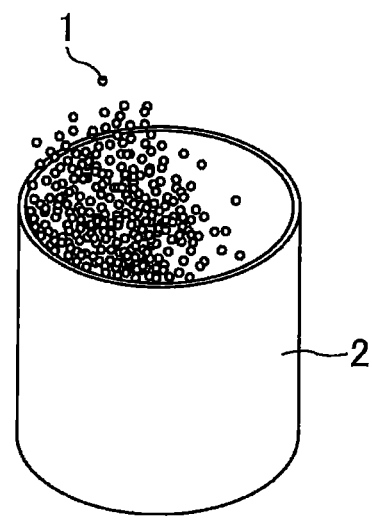
FIG. 1 shows a step in the measurement of the compression ratio and aggregate disintegration degree.

The present inventors conducted intensive studies about dripping inhibitors and they found out that a polytetrafluoroethylene fine powder with specific features can serve as a dripping inhibitor excellent in handling characteristics.

The dripping inhibitor of the present invention includes a modified polytetrafluoroethylene, the inhibitor having an average particle size of 300 to 800 μm, an apparent density of 0.40 to 0.52 g/ml, a compression ratio of 1.20 or less, an aggregate disintegration degree with 50-sec vibration of 70% or more, a cylinder extrusion pressure at a reduction ratio of 1500 (RR1500) of 80 MPa or less, and a standard specific gravity (SSG) of 2.140 to 2.230.

The dripping inhibitor of the present invention includes a modified polytetrafluoroethylene (hereinafter, also referred to as "modified PTFE"), and is a PTFE fine powder including the modified polytetrafluoroethylene.

Since the dripping inhibitor of the present invention has the above features, it exerts excellent handling characteristics. Its handling characteristics may be evaluated by its compression ratio and aggregate disintegration degree which will be described later. The handling characteristics are considered to be more excellent when the compression ratio is lower, and also when the aggregate disintegration degree is larger. Such a dripping inhibitor does not tend to aggregate, and can be easily unraveled even if it aggregates. Such a dripping inhibitor excellent in handling characteristics is also excellent in powder flowability, which can solve the problem of blocking in an automatic dispensing machine. The dripping inhibitor further exerts excellent dispersibility when mixed with a thermoplastic resin or other powders. Moreover, since the dripping inhibitor is easily dispersed in a resin and the like, it tends to exert its effects with an amount less than that of a dripping inhibitor including a conventional PTFE fine powder. Thus, cost reduction can be achieved.

The modified PTFE is fibrillatable and non-melt-fabricable.

The modified PTFE is a modified PTFE formed from tetrafluoroethylene [TFE] and a monomer (hereinafter, referred to as "modifying monomer") other than TFE. The modified PTFE preferably has a melting point of 325 to 347° C. The melting point is measured by differential scanning calorimetry (DSC) with the heating rate of 10° C./min.

The modifying monomer may be any monomer that can be copolymerized with TFE and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkyl ethylenes; and ethylene. One or more modifying monomers may be used.

The perfluorovinyl ethers are not specifically limited and examples thereof include perfluorinated unsaturated compounds represented by the following general formula (1):

$$CF_2=CF-ORf \quad (1)$$

wherein, Rf is a perfluorinated organic group. As used herein, "perfluorinated organic group" means an organic group in which all hydrogen atoms linked to a carbon atom(s) are substituted with fluorine atoms. The perfluorinated organic group may contain an ethereal oxygen atom.

More specific examples of the perfluorovinyl ethers include perfluoro (alkyl vinyl ethers) (PAVEs) which correspond to the above general formula (1) wherein Rf is a perfluoroalkyl group having 1 to 10 carbon atoms. The perfluoroalkyl group preferably has 1 to 5 carbon atoms.

Examples of the perfluoroalkyl group in the above PAVEs include perfluoromethyl, perfluoroethyl, perfluoropropyl, perfluorobutyl, perfluoropentyl, and perfluorohexyl groups. A preferable example of the PAVEs is perfluoropropyl vinyl ether (PPVE) which has a perfluoropropyl group as the perfluoroalkyl group. Further examples of the perfluorovinylethers include the ones having the above general formula (1) in which Rf is a perfluoro(alkoxyalkyl) group having 4 to 9 carbon atoms; in which Rf is the group represented by the following formula:

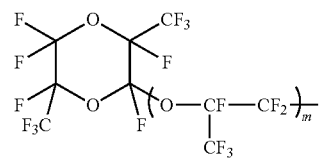

wherein m is 0 or an integer of 1 to 4; and in which Rf is the group represented by the following formula:

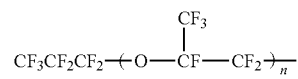

wherein n is an integer of 1 to 4; and the like.

The perfluoroalkyl ethylenes are not specifically limited and examples thereof include perfluorobutyl ethylene (PFBE), and perfluorohexyl ethylene.

The modifying monomer in the modified PTFE is preferably at least one selected from the group consisting of HFP, CTFE, VDF, PPVE, PFBE, and ethylene. It is more preferably at least one monomer selected from the group consisting of HFP and CTFE.

The modified PTFE preferably comprises 1% by mass or less, and more preferably from 0.001 to 1% by mass of the modifying monomer unit relative to total monomer units therein. As used herein, the modifying monomer unit is the moiety which is apart of the molecular structure of the modified PTFE and is derived from the modifying monomer. The total monomer units mean the moieties which are derived from all monomers in the molecular structure of the modified PTFE.

The dripping inhibitor of the present invention has a standard specific gravity (SSG) of 2.140 to 2.230, and more preferably 2.150 to 2.220. If the standard specific gravity is too high, the dispersibility in resin may be deteriorated. If the standard specific gravity is too low, the anti-drip performance may not sufficiently appear. The standard specific gravity (SSG) is measured in conformity with ASTM D 4895-89.

The dripping inhibitor of the present invention has an apparent density of 0.40 to 0.52 g/ml, and more preferably 0.45 to 0.52 g/ml. If the apparent density is too low, the powder has deteriorated handling characteristics. If the apparent density is too high, the dispersibility in resin may be deteriorated. The apparent density is measured in conformity with JIS K6892.

The dripping inhibitor of the present invention has a compression ratio of 1.20 or less, and more preferably 1.15 or less. The lower limit of the compression ratio may be 1, for example. A compression ratio closer to 1 is preferable. The closer to 1 the compression ratio of the dripping inhibitor is, the less the dripping inhibitor tends to aggregate and the more excellent handling characteristics the dripping inhibitor obtains.

The compression ratio is measured at 25° C. in accordance with the procedures (1) to (6) shown below:

(1) A round-shaped powder paper (diameter: 50 mm) is placed at the bottom of a SUS cylindrical cup (inner diameter: 50 mm (measured value: 51.7 mm), volume: 150 ml). The inner side surface of the cup is also covered with a powder paper.

(2) The dripping inhibitor is sieved with a 10-mesh sieve, and 50 g of the material passing through the sieve is sampled and placed in the cylindrical cup.

(3) The surface of the dripping inhibitor in the cylindrical cup is smoothened and covered with a round-shaped powder paper (diameter: 50 mm).

(4) A weight (a cylinder having a diameter of 50 mm, weight: 330 g) is placed on the powder paper on the surface, and is tapped for 20 times on a Powder Tester (Hosokawa Micron Corporation) (tapping stroke: 20 mm).

(5) After tapping, a cylindrical cake of the dripping inhibitor is taken out from the cylindrical cup and the height thereof is measured with a caliper.

(6) The apparent density of the cake is calculated from the cross-section area and height of the cake and the compression ratio is calculated from the following equation (A):

(Compression ratio)=(Apparent density of cake)/ (Apparent density of dripping inhibitor)   (A), wherein the apparent density of the dripping inhibitor is measured in conformity with JIS K6892, as described above.

The dripping inhibitor of the present invention has an aggregate disintegration degree with 50-sec vibration of 70% or more, and more preferably 80% or more. Higher aggregate disintegration degree is preferable. A dripping inhibitor with a higher aggregate disintegration degree tends to be easily unraveled, and is more excellent in handling characteristics and powder flowability.

The aggregate disintegration degree with 50-sec vibration is measured at 25° C. according to the following procedures (1) to (7):

(1) A round-shaped powder paper (diameter: 50 mm) is placed at the bottom of a SUS cylindrical cup (inner diameter: 50 mm (measured value: 51.7 mm), volume: 150 ml). The inner side surface of the cup is also covered with a powder paper.

(2) The dripping inhibitor is sieved with a 10-mesh sieve, and 50 g of the material passing through the sieve is sampled and placed in the cylindrical cup.

(3) The surface of the dripping inhibitor in the cylindrical cup is smoothened and covered with a round-shaped powder paper (diameter: 50 mm).

(4) A weight (a cylinder having a diameter of 50 mm, weight: 330 g) is placed on the powder paper on the surface, and is tapped for 20 times in a Powder Tester (Hosokawa Micron Corporation) (tapping stroke: 20 mm).

(5) After tapping, a cylindrical cake of the dripping inhibitor is taken out from the cylindrical cup.

(6) The cylindrical cake taken out is placed on a 8-mesh sieve and subjected to vibration for 50 seconds on a Powder Tester (Hosokawa Micron Corporation) (vibration scale: 4.5).

(7) The mass of the PTFE fine powder dropped by vibration is weighed and the aggregate disintegration degree is calculated from the following equation (B):

(Aggregate disintegration degree)=(Mass of dripping inhibitor passed through the sieve during 50 second vibration)/(Total mass of dripping inhibitor)×100(% by mass)   (B)

The dripping inhibitor of the present invention has an average particle size of 300 to 800 μm, and preferably 400 to 700 μm. If the average particle size is too small, the proportion of a too fine powder in the dripping inhibitor is too large, by which the fine powder may tend to have problems such as fly up, adhesion, and the like. If the average particle size is too large, the dispersibility in resin may be deteriorated. The average particle size is measured in conformity with JIS K6891.

The dripping inhibitor of the present invention preferably has a cylinder extrusion pressure at a reduction ratio of 1500 of 80 MPa or less, and more preferably 70 MPa or less. The cylinder extrusion pressure at a reduction ratio of 1500 is preferably 50 MPa or more.

The cylinder extrusion pressure at a reduction ratio of 1500 is measured according to the following procedures: The dripping inhibitor (50 g) and an extrusion aid, hydrocarbon oil (10.25 g, trade name: ISOPAR G, Exxon Mobil Corporation) are mixed in a glass bottle and aged at room temperature (25±2° C.) for 1 hour. The mixture is charged in an extrusion die (reduction angle: 30°; equipped with an orifice (diameter: 0.65 mm, length: 2 mm) on its lower end) equipped with a cylinder (inner diameter: 25.4 mm). A load of 1.2 MPa is applied to a piston in the cylinder and maintained for 1 min, immediately followed by extrusion of the mixture from the orifice at room temperature at a ram speed of 20 mm/min to obtain a rod-shaped material. The pressure to the mixture is measured in a period in which the pressure is stable in the latter half of the extrusion. This pressure is divided by the cross-sectional area of the cylinder, and the obtained value is used as the extrusion pressure.

The dripping inhibitor of the present invention may be manufactured by the process described below.

The dripping inhibitor of the present invention may be suitably manufactured by a process including the steps of:

(1) preparing an aqueous dispersion containing a modified polytetrafluoroethylene, an aqueous medium, and a surfactant (A);

(2) initiating coagulation of the modified polytetrafluoroethylene in the aqueous dispersion by agitating the aqueous dispersion;

(3) adding a surfactant (B) after (2);

(4) terminating the coagulation;

(5) collecting a wet powder of the modified polytetrafluoroethylene; and (6) drying the wet powder of the modified polytetrafluoroethylene.

The process includes the step (1) of preparing an aqueous dispersion containing a modified polytetrafluoroethylene [modified PTFE], an aqueous medium, and a surfactant (A).

The aqueous dispersion in the step (1) can be prepared by aqueous dispersion polymerization, or by further treating the aqueous dispersion obtained by aqueous dispersion polymerization (emulsion polymerization) by techniques such as ion-exchange treatment, cloud point concentration, electro-concentration, and ultrafiltration.

The surfactant (A) is preferably at least one selected from the group consisting of anionic surfactants, fluorine-containing anionic surfactants, nonionic surfactants and fluorine-containing nonionic surfactants, and more preferably at least one selected from the group consisting of fluorine-containing anionic surfactants and nonionic surfactants. It is still more preferably a fluorine-containing anionic surfactant. The present process is still efficacious in preparing a PTFE fine powder when the polymerization is carried out in the presence of any of the fluorine-containing surfactants (including fluorine-containing anionic surfactants and fluorine-containing nonionic surfactants) having 7 or less or 6 or less carbon atoms as the surfactant (A).

Examples of the fluorine-containing anionic surfactants include carboxylic surfactants, and sulfonic surfactants. The fluorine-containing anionic surfactants are preferably the carboxylic surfactants represented by the following general formula (i), (ii), (iii), (iv), (v), (vi) or (vii).

Examples of the fluorine-containing anionic surfactants may be carboxylic surfactants represented by the general formula (i):

$$X\text{—}Rf^1COOM^1 \qquad (i)$$

wherein X is H, F or Cl; $Rf^1$ is a linear or branched fluoroalkylene group having 4 to 14, preferably 5 to 7 carbon atoms, for example, a linear or branched fluoroalkylene group having 7 carbon atoms and, inter alia, is a linear or branched perfluoroalkylene group; and $M^1$ is a monovalent alkali metal, $NH_4$ or H.

Examples of the carboxylic surfactants represented by the general formula (i) include $C_5F_{11}COOH$, $C_6F_{13}COOH$, $C_7F_{15}COOH$, and the like and salts thereof.

Examples of the fluorine-containing anionic surfactants may also be the carboxylic surfactants represented by the general formula (ii):

$$X^1(CF_2)_p\text{—}O\text{—}CX^2X^3\text{—}(CF_2)_q\text{—}O\text{—}CX^4X^5\text{—}(CF_2)_r\text{—}COOM^1 \qquad (ii)$$

wherein $X^1$, $X^2$, $X^3$, $X^4$, and $X^5$ are the same or different from each other and represent H, F, or $CF_3$; $M^1$ is a monovalent alkali metal, $NH_4$, or H; p is 1 or 2; q is 1 or 2; and r is 0 or 1. Examples of the fluoroether carboxylic acids represented by the general formula (ii) include $CF_3OCF(CF_3)CF_2OCF(CF_3)COONH_4$, $CF_3CF_2OCF_2CF_2OCF_2COONH_4$, $CF_3OCF_2CF_2CF_2OCHFCF_2COONH_4$, and the like.

Examples of the fluorine-containing anionic surfactants may also be the carboxylic surfactants represented by the general formula (iii):

$$X\text{—}(CF_2)_m\text{—}O\text{—}(CF(CF_3)CF_2O)_n\text{—}CF(CF_3)COOM^1 \qquad (iii)$$

wherein X is H, F, or Cl; m is an integer of 1 to 10, e.g. 5; n is an integer of 0 to 5, e.g. 1; and $M^1$ is a monovalent alkali metal, $NH_4$, or H.

Examples of the carboxylic surfactants represented by the general formula (iii) include $CF_3\text{—}O\text{—}CF(CF_3)CF_2O\text{—}CF(CF_3)COOH$ and the like and salts thereof.

Examples of the fluorine-containing anionic surfactants may also be the carboxylic surfactants represented by the general formula (iv):

$$X\text{—}(CF_2)_m\text{—}O\text{—}(CF(CF_3)CF_2O)_n\text{—}CHFCF_2COOM^1 \qquad (iv)$$

wherein X, m, n, and $M^1$ are as defined above.

Examples of the fluorine-containing anionic surfactants may also be the carboxylic surfactants represented by the general formula (v):

$$X\text{—}(CF_2)_m\text{—}O\text{—}(CF(CF_3)CF_2O)_n\text{—}CH_2CF_2COOM^1 \qquad (v)$$

wherein X, m, n, and $M^1$ are as defined above.

Examples of the fluorine-containing anionic surfactants may also be the carboxylic surfactants represented by the general formula (vi):

$$Rf^3OCF_2CF_2O(CF_2)_pCOOM^1 \qquad (vi)$$

wherein $Rf^3$ is a partially-fluorinated or perfluorinated alkyl group; $M^1$ is a monovalent alkali metal, $NH_4$, or H; and p is 1 or 2. $Rf^3$ is preferably an alkyl group having 1 to 3 carbon atoms. Examples of the carboxylic surfactants represented by the general formula (vi) include $CF_3CF_2OCF_2CF_2OCF_2COONH_4$, $CF_3CF_2OCF_2CF_2OCF_2COOH$, and the like.

Examples of the fluorine-containing anionic surfactants may also be the fluoroether carboxylic acids represented by the general formula (vii):

$$Rf^4OCHFCF_2COOM^1 \qquad (vii)$$

wherein $Rf^4$ is a linear aliphatic group or a linear aliphatic group to which one or more oxygen atoms are introduced, both aliphatic groups being partially-fluorinated or perfluorinated; and $M^1$ is a monovalent alkali metal, $NH_4$, or H. $Rf^4$ is preferably an aliphatic group having 1 to 3 carbon atoms. Examples of the carboxylic surfactants represented by the general formula (vii) include $CF_3OCF_2CF_2CF_2OCHFCF_2COONH_4$, $CF_3OCF_2CF_2CF_2OCHFCF_2COOH$, and the like.

Thus, preferred is at least one fluorine-containing surfactant selected from the group consisting of: the carboxylic surfactants represented by the general formula (i):

$$X\text{—}Rf^1COOM^1 \qquad (i)$$

wherein X is H, F, or Cl; $Rf^1$ is a linear or branched fluoroalkylene group having 4 to 14, preferably 5 to 7 carbon atoms; and $M^1$ is a monovalent alkali metal, $NH_4$, or H;
the carboxylic surfactants represented by the general formula (ii):

$$X^1(CF_2)_p\text{—}O\text{—}CX^2X^3\text{—}(CF_2)_q\text{—}O\text{—}CX^4X^5\text{—}(CF_2)_r\text{—}COOM^1 \qquad (ii)$$

wherein $X^1$, $X^2$, $X^3$, $X^4$, and $X^5$ are the same or different from each other and represent H, F, or $CF_3$; $M^1$ is a monovalent alkali metal, $NH_4$, or H; p is 1 or 2; q is 1 or 2; and r is 0 or 1; the carboxylic surfactants represented by the general formula (iii):

$$X\text{—}(CF_2)_m\text{—}O\text{—}(CF(CF_3)CF_2O)_n\text{—}CF(CF_3)COOM^1 \qquad (iii)$$

wherein X is H, F, or Cl; m is an integer of 1 to 10; n is an integer of 0 to 5; and $M^1$ is a monovalent alkali metal, $NH_4$, or H;
the carboxylic surfactants represented by the general formula (iv):

$$X\text{—}(CF_2)_m\text{—}O\text{—}(CF(CF_3)CF_2O)_n\text{—}CHFCF_2COOM^1 \qquad (iv)$$

wherein X, m, n, and $M^1$ are as defined above;
the carboxylic surfactants represented by the general formula (v):

$$X\text{—}(CF_2)_n\text{—}O\text{—}(CF(CF_3)CF_2O)_n\text{—}CH_2CF_2COOM^1 \qquad (v)$$

wherein X, m, n, and $M^1$ are as defined above;
the carboxylic surfactants represented by the general formula (vi):

$$Rf^3OCF_2CF_2O(CF_2)_pCOOM^1 \qquad (vi)$$

wherein $Rf^3$ is a partially-fluorinated or perfluorinated alkyl group; $M^1$ is a monovalent alkali metal, $NH_4$, or H; and p is 1 or 2; and
the carboxylic surfactants represented by the general formula (vii):

$$Rf^4OCHFCF_2COOM^1 \qquad (vii)$$

wherein $Rf^4$ is a linear aliphatic group or a linear aliphatic group to which one or more oxygen atoms are introduced, both aliphatic groups being partially-fluorinated or perfluorinated; and $M^1$ is a monovalent alkali metal, $NH_4$, or H.

The nonionic surfactants which may be used as the surfactant (A) are not specifically limited so long as they are nonionic surfactants devoid of fluorine atoms. Examples thereof include ether-based nonionic surfactants such as polyoxyethylene alkylphenyl ethers, polyoxyethylene alkyl ethers, polyoxyethylene alkylene alkyl ethers; polyoxyethylene derivatives such as ethylene oxide/propylene oxide block copolymers; ester-based nonionic surfactants such as sorbitan fatty acid esters, polyoxyethylene sorbitan fatty acid esters, polyoxyethylene sorbitol fatty acid esters, fatty acid esters of glycerol, polyoxyethylene fatty acid esters; and amine-based nonionic emulsifiers such as polyoxyethylene alkylamines, alkyl alkanolamides, and the like. From the environmental point of view, nonionic surfactants which do not contain any alkyl phenol in their structures are preferably used.

The concentration of the surfactant (A) in the aqueous dispersion is preferably from 0.001 to 10% by mass, and more preferably from 0.005 to 1% by mass relative to the PTFE.

The aqueous dispersion in the step (1) can be prepared by aqueous dispersion polymerization, or by further treating the aqueous dispersion obtained by aqueous dispersion polymerization (emulsion polymerization) by techniques such as ion-exchange treatment, cloud point concentration, electroconcentration, and ultrafiltration.

The aqueous dispersion polymerization can be carried out by applying well-known polymerization techniques which may be carried out with batch, semi-batch or continuous manners. The above fluorine-containing anionic surfactant, the modifying monomer, a polymerization initiator, a stabilizer, a chain transfer agent, and the like can be continuously or sequentially added during the aqueous dispersion polymerization reaction depending on the desired molecular weight and properties of a target PTFE. The aqueous dispersion polymerization is generally carried out for 0.5 to 50 hours.

The aqueous dispersion polymerization is carried out by using a polymerization initiator with agitation in an aqueous medium and in the presence of the fluorine-containing anionic surfactant in a pressure resistant reactor equipped with an agitator. After charging an aqueous medium, a chain transfer agent, the monomers, and an optional stabilizer, and adjusting the temperature and pressure, the aqueous dispersion polymerization can be initiated by addition of the polymerization initiator.

The aqueous dispersion polymerization can be carried out while feeding a monomer into the aqueous medium. In the aqueous dispersion polymerization, tetrafluoroethylene (TFE) may be only one monomer that is fed, or both TFE and the modifying monomer polymerizable with TFE may be fed.

The aqueous medium is preferably deionized, highly-purified water.

The fluorine-containing anionic surfactant can be fed to the polymerization reaction system by various ways. For example, the entire amount thereof may be fed to the reaction system at one time before the reaction is started, or it can be fed gradually in order to control the size of resulting particles as described in JP 44-14466 A. In order to improve the stability of the aqueous dispersion during the polymerization, it is preferably added during the polymerization sequentially or continuously.

The fluorine-containing anionic surfactant can be generally used, although it may depend on the type of the fluorine-containing anionic surfactant used and the desired primary particle size, in an amount selected from the range from 0.02 to 0.50% by mass relative to the aqueous medium used in the reaction.

For the purpose of stabilization of the dispersion in the reaction system, a stabilizer may optionally be added.

The stabilizer is preferably paraffin wax, fluorine-containing oil, fluorine-containing compounds, silicone oil, and the like which are substantially inert in the reaction, among which paraffin wax is preferred.

The paraffin wax is preferably hydrocarbons having 12 or more carbon atoms and being liquid under reaction conditions, among which hydrocarbons having 16 or more carbon atoms are more preferred. The melting point thereof is preferably from 40 to 65° C., and more preferably from 50 to 65° C.

The paraffin wax is preferably used in an amount corresponding to from 1 to 12% by mass, and more preferably from 2 to 8% by mass of the aqueous medium.

In order to adjust the pH of the reaction system during the reaction, a buffering agent such as ammonium carbonate and ammonium phosphate may be added.

The polymerization initiator for the emulsion polymerization may be the one conventionally used in polymerization of TFE.

The polymerization initiator for the emulsion polymerization is preferably radical polymerization initiators, redox-type polymerization initiators, and the like.

Although the amount of the polymerization initiator is preferably low because the SSG of the resulting TFE polymer can be decreased, an extremely low amount tends to cause a reduced polymerization rate and an extremely high amount tends to cause an increased SSG of the resulting TFE polymer.

Examples of the radical polymerization initiator include water-soluble peroxides and the like, among which persulfates such as ammonium persulfate, potassium persulfate; permanganates such as potassium permanganate; and water-soluble organic peroxides such as disuccinic acid peroxide are preferred with ammonium persulfate being more preferred. One or two or more in combination of these compounds may be used.

The amount of the radical polymerization initiator may be appropriately selected according to the polymerization temperature and a target SSG, and is preferably 1 to 100 ppm, and more preferably from 1 to 20 ppm of the mass of the aqueous medium generally used.

When the radical polymerization initiator is used as the polymerization initiator, a TFE polymer having a low SSG can be obtained by adding a radical scavenger during the polymerization reaction.

Examples of the radical scavenger include unsubstituted phenols, polyhydric phenols, aromatic hydroxy compounds, aromatic amines, quinone compounds, and the like, among which hydroquinone is preferred.

The radical scavenger is preferably added before the polymerization of 50% by mass, and more preferably 30% by mass of the whole amount of TFE to be consumed during the polymerization reaction is completed, in order to obtain PTFE having a low SSG.

The amount of the radical scavenger is preferably 0.1 to 10 ppm of the aqueous medium generally used.

Examples of the redox-type polymerization initiator include a combination of a water-soluble oxidizing agent such as permanganates, e.g. potassium permanganate, persulfates, bromates, and a reducing agent such as sulfites, bisulfites, oxalic acid, iron (II) chloride, and diimine. Among them, the combination of potassium permanganate and oxalic acid is preferred.

When the redox-type polymerization initiator is used as the polymerization initiator, a TFE polymer having a low SSG and high breaking strength can be obtained.

The amount of the redox polymerization initiator can be appropriately selected according to the polymerization temperature and a target SSG, and is preferably 1 to 100 ppm of the mass of the aqueous medium generally used.

Regarding the redox-type polymerization initiator, in order to obtain PTFE having a low SSG, addition of either of the oxidizing agent and reducing agent, preferably the oxidizing agent, is preferably halted in the middle of the polymerization reaction. The addition is preferably halted before the polymerization of 50% by mass, and more preferably 30% by mass of the whole amount of TFE to be consumed during the polymerization reaction is completed.

The aqueous dispersion polymerization is preferably carried out in the presence of a dicarboxylic acid in an amount of 30 to 200 ppm relative to the aqueous medium, in order to reduce the amount of coagulated matter formed during the polymerization reaction. The dicarboxylic acid may be added prior to the initiation of the polymerization reaction or during the polymerization reaction.

The dicarboxylic acid is preferably the one represented by the general formula: HOOCRCOOH, wherein R is an alkylene group having 1 to 5 carbon atoms. Among them, succinic acid, malonic acid, glutaric acid, adipic acid, and pimelic acid are more preferred with succinic acid being further preferred.

The modifying monomer may be one intended to adjust the molding properties, extruding pressure, and transparency and mechanical strength of molded articles.

A chain transfer agent may also be added in order to adjust the molecular weight and extrusion pressure. Examples of the chain transfer agent include hydrogen; hydrocarbons such as methane, ethane, and propane; halogenated hydrocarbons such as $CH_2CF_2$, $CH_3Cl$, $CH_2Cl_2$, and $C_2H_3Cl_2F$; and water-soluble organic compounds such as methanol and ethanol. It may be added at the beginning of the polymerization or during the polymerization depending on the purposes of addition thereof. It may be added at one time, sequentially, or continuously.

The polymerization conditions such as the temperature and pressure in the aqueous dispersion polymerization are not specifically limited and can be appropriately selected according to the amount of TFE used, the type and amount of the modifying monomer(s), the type and amount of the polymerization initiator(s), productivity or the like. The temperature during the polymerization is preferably from 5 to 100° C., and more preferably from 50 to 90° C. The pressure during the polymerization is preferably from 0.1 to 3.9 MPa.

The polymerization reaction can be stopped by terminating the agitation when the concentration of the polymer latex produced reaches 20 to 45% by mass and discharging the monomers from the system.

The production process includes the step (2) of initiating coagulation of the polytetrafluoroethylene in the aqueous dispersion by agitating the aqueous dispersion prepared in the step (1). A person skilled in the art can appropriately select a rotational speed of the agitation based on the size of containers, the shape of impellers and structure of baffle plates. It is well-known to a person skilled in the art that the agitation in the step (2) is generally needed to be more vigorous than the agitation in the aqueous dispersion polymerization. In general, when a strong shear force is applied to aqueous dispersions, primary PTFE particles are aggregated to form a wet powder in water via a state of slurry. The wet powder then becomes water repellent and is separated from water.

The aqueous dispersion prepared in the step (1) may be diluted with water to a polymer concentration of 10 to 20% by mass.

When the aqueous dispersion is prepared by aqueous dispersion polymerization in the step (1), the steps (1) and (2) may be continuously performed.

The step (2) is also preferably the one in which coagulation is initiated by starting agitation after or at the same time of addition of a coagulant. The coagulant is preferably at least one selected from the group consisting of inorganic acids, inorganic salts, and water-soluble organic compounds. Examples of the inorganic acids include hydrochloric acid, sulfuric acid, nitric acid, and the like. Examples of the inorganic salts include potassium nitrate, sodium nitrate, ammonium carbonate, sodium carbonate, aluminium nitrate, aluminium sulfate, magnesium nitrate, magnesium sulfate, ammonium hydrogen carbonate, sodium hydrogen carbonate, and the like. Examples of the water-soluble organic compounds include methanol, acetone, ethanol, and the like.

In the step (2), the pH may optionally be adjusted. In the step (2), the temperature and specific gravity of the aqueous dispersion are preferably adjusted to from 0 to 80° C. and from 1.03 to 1.20, respectively. Before or during coagulation, a pigment for colouring and a filler for imparting conductivity and improved mechanical properties can also be added.

The step (2) may also be a step of initiating coagulation of the polytetrafluoroethylene in the aqueous dispersion prepared in the step (1) by agitating the aqueous dispersion with a discharge flow-type impeller.

In the process, the step (2) may also be a step of initiating coagulation of the polytetrafluoroethylene in the aqueous dispersion prepared in the step (1) by agitating the aqueous dispersion with a discharge flow-type impeller.

By applying a strong shear force to the PTFE aqueous dispersion obtained by emulsion polymerization of TFE (in which primary particles are dispersed in the aqueous medium), the primary particles are destabilized to aggregate, and simultaneously entrain the air, so that they are separated from water to give the PTFE fine powder (see Fluororesin Handbook ("Fusso Jushi Handbook"), ed. Takaomi Satokawa). The aggregate of the primary particles (fine powder) collected from the aqueous dispersion, i.e. the PTFE fine powder obtained by coagulation, has a large specific surface area as well as fibrillating properties. On the other hand, the powder obtained by granulating a powder obtained by suspension polymerization of TFE has a small specific surface area and has poor fibrillating properties. Thus, the step of agitating the aqueous dispersion of PTFE primary particles to effect coagulation is substantially different from the step of granulating a PTFE powder obtained by suspension polymerization.

The discharge flow-type impeller can create an axial flow which allows the fine powder which has been rendered to be water-repellent by coagulation, to be easily entrained in water. Consequently, the fine powder becomes resistant to disruption and tends to be rolled on container walls. Thus, the fine powder is less compressed, so that aggregates of the fine powder may be easily disintegrated. In addition, the resulting powder may have a narrow shape distribution.

The discharge flow-type impeller may be a cylinder-shaped or cone-shaped (truncated cylinder-shaped) impeller provided therein with a component that causes a flow as a shaft rotates. The component that induces a flow by agitation may be a conventional impeller of a paddle-, anchor-, ribbon-, or propeller-type, or the like, or may be a flat plate directly connected to the cylinder or cone. The cylinder or cone, when rotated, allows the component or directly connected plate for inducing a flow to create an axial flow, thereby agitating the content. Alternatively, the discharge flow-type impeller may be one in which guide plate(s) or a guide cylinder is/are installed around such an impeller as described above. The shape and number of the guide plates are not specifically limited. The guide cylinder preferably has a cylinder or truncated cone (cone) shape. As the impeller is rotated, the guide plate(s) or guide cylinder allow (s) the impeller to create an axial flow, thereby agitating the content.

Figure 4:
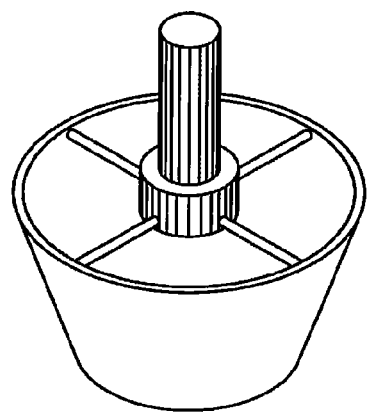
FIG. 4 is a schematic view of examples of cone-shaped impellers, in which (a) is an upward tapering cone-shaped impeller, (b) is a downward tapering cone-shaped impeller, (c) is a frontal coupling cone-shaped impeller, and (d) is a double cone-shaped impeller having a disc saw.
Figure 4:
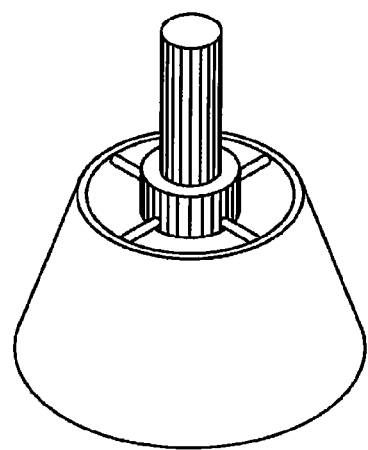
Figure 4:
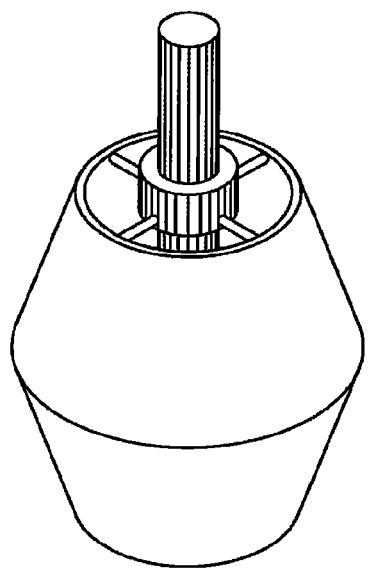
Figure 4:
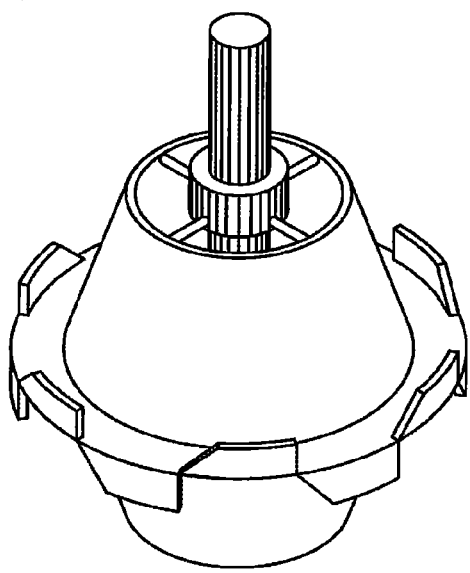

Among these, the discharge flow-type impeller is preferably any of the cone-shaped impellers shown in FIG. 4.

Examples of the cone-shaped impellers include an upward tapering cone-shaped impeller, a downward tapering cone-shaped impeller, a frontal coupling cone-shaped impeller, a double cone-shaped impeller having a disc saw, and the like.

FIG. 4 is a schematic view of examples of cone-shaped impellers, in which (a) is an upward tapering cone-shaped impeller, (b) is a downward tapering cone-shaped impeller, (c) is a frontal coupling cone-shaped impeller, and (d) is a double cone-shaped impeller having a disc saw.

Among cone-shaped impellers, downward tapering type is more preferred.

A person skilled in the art can appropriately select the rotational speed of the agitation based on the size of containers, the shape of impellers, and structure of baffle plates. It is well-known to a person skilled in the art that the agitation in the step (2) is generally needed to be more vigorous than the agitation in the aqueous dispersion polymerization. In general, when a strong shear force is applied to aqueous dispersions, primary PTFE particles are aggregated to form a wet powder in water via a state of slurry. The wet powder then becomes water repellent and is separated from water.

The rotational speed of the agitation is not limited, but may be generally from 50 to 1000 rpm.

When the discharge flow-type impeller is used for the agitation in the step (2), the discharge flow-type impeller is generally used until the end of coagulation in the step (4).

The process includes the step (3) of adding a surfactant (B) after the step (2).

Examples of the surfactant (B) include fluorine-containing surfactants such as fluorine-containing anionic surfactants, fluorine-containing nonionic surfactants, fluorine-containing cationic surfactants, and fluorine-containing betaine surfactants; and hydrocarbon-based surfactants such as hydrocarbon-based nonionic surfactants and hydrocarbon-based anionic surfactants.

Examples of the fluorine-containing anionic surfactants include the compounds represented by the general formula (1). Specific examples may include $CF_3(CF_2)_6COONH_4$, $CF_3(CF_2)_7COONa$, $H(CF_2CF_2)_4COONH_4$, and the like.

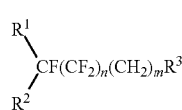
(1)

wherein $R^1$ is F or $CF_3$; $R^2$ is H, F, or $CF_3$, n is an integer of 4 to 20; m is 0 or an integer of 1 to 6; and $R^3$ is COOM or $SO_3M$, wherein M is H, $NH_4$, Na, K, or Li.

Examples of the fluorine-containing nonionic surfactants include the compounds represented by the general formula (2).

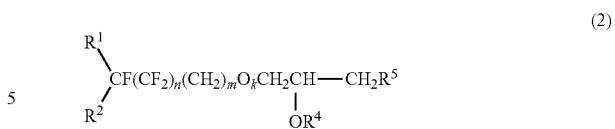
(2)

wherein $R^1$, $R^2$, n, and m are as defined above; k is 0 or 1; $R^4$ is H, $CH_3$, or $OCOCH_3$; and $R^5$ is $(OCH_2CH_2)_pOR^6$, wherein p is 0 or an integer of 1 to 50; and $R^6$ is H, an alkyl group having 1 to 20 carbon atoms, or an aromatic group having 6 to 26 carbon atoms.

Examples of the fluorine-containing cationic surfactants include the compounds represented by the above general formula (2), wherein $R^5$ is the group represented by the formula (3).

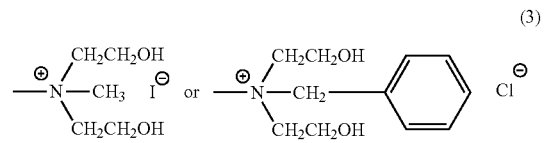
(3)

Examples of the fluorine-containing betaine surfactants include the compounds represented by the above general formula (2), wherein $R^5$ is the group represented by the formula (4).

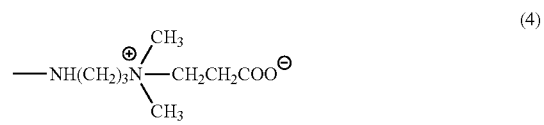
(4)

Examples of the hydrocarbon-based nonionic surfactants include polyoxyethylene alkyl ethers, polyoxyethylene alkyl esters, polyoxyethylene alkylphenyl ethers, sorbitan alkylates, polyoxyethylene sorbitan monoalkylates, and the like.

Examples of the hydrocarbon-based anionic surfactants include alkyl carboxylates, alkyl sulfonates, alkyl sulfates, alkyl benzene sulfonates, alkyl phosphonates, alkyl phosphates, and the like.

The surfactant (B) is preferably a nonionic surfactant, and more preferably a hydrocarbon-based nonionic surfactant because it can contribute to effects with a small amount.

The amount of the surfactant (B) used is preferably 1 ppm to 10% by mass relative to the polymer solid matter in the PTFE aqueous dispersion. When the amount of the surfactant (B) is too small, the PTFE fine powder having superior handling characteristics may not be obtained, and when the amount of the surfactant (B) is too high, the surfactant (B) tends to remain in the fine powder to stain the same. The lower limit of the amount of the surfactant (B) used is more preferably 50 ppm and the upper limit is more preferably 10000 ppm.

In the step (3), the surfactant (B) is preferably added after the primary particles of the PTFE are aggregated to form a slurry. If the surfactant is entrained in the fine powder, reduction of the effects of addition of the surfactant and coloration of the fine powder and molded articles tend to occur. However, when the surfactant (B) is added at this time, the surfactant in a small amount can deliver desired effects of the present invention. Due to the same reason, the surfactant (B) is more preferably added after the wet powder of the PTFE is formed. It is preferably added immediately before or after the wet powder becomes water repellent and is separated from water. It is more preferable that it is added immediately before the wet powder becomes water repellent and is separated from water.

The present process includes the step (4) of terminating the coagulation after the step (3). The coagulation can be terminated by halting the agitation. The coagulation is preferably terminated after confirming that the resulting liquid is no longer in a slurry state and the water phase is transparent enough to see through. The coagulation is preferably terminated after the agitation is continued for 30 sec or more, preferably 1 min or more, and more preferably 3 min or more after water is separated (after water is repelled).

It is also possible to find when the surfactant is to be added and when the coagulation is to be terminated by monitoring change in torque or change in sound during the coagulation.

The process includes the step (5) of collecting a wet powder of the PTFE. The wet powder of the polytetrafluoroethylene can be collected by filtering off the wet powder of the PTFE from the mixture of the PTFE coagulation particles, water, and the surfactant (B), obtained in the step (4).

The process may include the step of washing the wet powder of the PTFE obtained in the step (4). The washing can be carried out by adding water and the surfactant (B) to the wet powder, keeping agitation until the PTFE particles repel water, and collecting the wet powder of the PTFE. The handling characteristics of the PTFE fine powder can be further improved when the above agitation is carried out at 30 to 90° C. The temperature for the above agitation is more preferably 30 to 60° C.

The process includes the step (6) of drying the wet powder of the PTFE.

The drying is preferably carried out with little flow of the wet powder of the PTFE and by heating means such as hot air, which can be combined with reduced pressure or vacuum. The temperature for drying may be below the melting point of the polymer and is usually suitable in the range of 100 to 300° C. The drying temperature is preferably 180° C. or more and below 300° C.

The drying conditions may affect paste extrusion performances. The paste extrusion pressure tends to be increased with increased drying temperature. The friction of the powder, especially at high temperatures, is liable to cause adverse effects on the properties of the fine powder because the fine powder is easily fibrillated with a small shear force and loses its original particle structures to result in decreased paste extrusion performances.

The resin compound of the present invention includes the dripping inhibitor and a thermoplastic resin. Since the resin compound of the present invention includes the dripping inhibitor, the handling characteristics of the resin compound are excellent.

The resin compound of the present invention preferably includes 0.01 to 5 parts by weight of the dripping inhibitor for each 100 parts by weight of the thermoplastic resin. More preferably, the resin compound includes 0.03 to 2 parts by weight of the dripping inhibitor for each 100 parts by weight of the thermoplastic resin. If the amount of the dripping inhibitor is too small, the desired anti-dripping ability may not be achieved. If the amount thereof is too large, the dripping inhibitor may not be finely dispersed in the resin compound although the anti-dripping ability, the mold releasability from metallic molds, and the frictional property of molded products are improved.

The thermoplastic resin is preferably a flammable thermoplastic resin. If a flammable thermoplastic resin is used, the anti-drip effect becomes more excellent. Examples of the thermoplastic resin include polyolefin resins such as polyethylene, polypropylene, and ethylene-propylene copolymers; polyester resins such as polyethylene terephthalate (PET), polyethylene naphthalate, polycyclohexane terephthalate, polybutylene terephthalate (PBT), and polybutylene naphthalate; polycarbonates (PCs); butadiene rubber graft copolymers (e.g., ABS resin); acrylic rubber graft copolymers; silicone/acrylic composite rubber graft copolymers; ethylene propylene rubber graft copolymers; styrene resins such as HIPS and AS; vinyl chloride resins; polyacetal resins; polyphenylene sulfide resins; polyphenylene ether resins (PPEs); polyamide resins (PA) such as nylon 6 and nylon 66; acryl resins such as PMMA; and various polymer alloys such as PET/PBT, PC/PBT, PBT/ABS, PC/ABS, PA/ABS, PPE/PBT, PPE/HIPS, and PPE/PA.

Preferable among these is at least one selected from the group consisting of polycarbonates, acrylonitrile-styrene (AS) resins, acrylonitrile-butadiene-styrene (ABS) resins, (polycarbonate)/(acrylonitrile-butadiene-styrene) alloy resins, polybutylene terephthalate, polyethylene terephthalate, polyphenylene ether, polypropylene, and polystyrene.

Excellent anti-drip effect may be achieved when the drip inhibitor is applied to resins intended for applications requiring a high level of flame retardance, such as housing elements and various mechanism elements of consumer electronics and OA equipment, examples of the resins including PCs, PC alloy resins, polystyrene resins, polybutylene terephthalate, polyethylene terephthalate, and polyphenylene ethers. For example, the thermoplastic resin is preferably at least one resin selected from the group consisting of PCs, PC/ABS alloy resins, PC/PBT alloy resins, AS resins, ABS resins, polybutylene terephthalate, polyethylene terephthalate, and polyphenylene ethers. Among these, polycarbonates are particularly preferable.

Moreover, the resin compound of the present invention preferably includes a flame retardant. A resin compound including a flame retardant may be suitably used as a flame-retardant resin compound.

The amount of the flame retardant is preferably 0.001 to 40 parts by weight, and more preferably 0.01 to 30 parts by weight for each 100 parts by weight of the thermoplastic resin. If the amount of the flame retardant is too small, the flame-retardant effect tends to be insufficient. If the amount thereof is too large, mechanical characteristics (such as impact resistance) of the resin compound tends to be deteriorated in addition to being less economic.

Major examples of the flame retardant include compounds containing an element in group 5B of the periodic table, such as nitrogen, phosphorus, antimony, and bismuth; and halogen compounds containing a halogen in group 7B. Examples of the halogen compounds include aliphatic-, alicyclic-, and aromatic-organic halogen compounds such as bromine compounds (e.g., tetrabromobisphenol A (TBA), decabromodiphenyl ether (DBDPE), octabromodiphenyl ether (OBDPE), TBA epoxy/phenoxy oligomer, and brominated cross-linked polystyrene) and chlorine compounds (e.g., chlorinated paraffin, and perchloro-cyclopentadecane). Examples of the phosphorous compounds include phosphate esters and polyphospharic acid salts. Combination of an antimony compound such as antimony trioxide and antimony pentoxide and a halogen compound is preferably used. Alternatively, aluminium hydroxide, magnesium hydroxide, and molybdenum trioxide may also be used. The flame retardant may be selected at least one from these and the amount thereof may be adjusted in accordance with the type of the thermoplastic resin. The flame retardant is not limited to these.

The resin compound of the present invention includes the thermoplastic resin and the dripping inhibitor of the present invention. The compound may be produced by blending all materials according to a known process. There are no limitations in details of the process such as order of blending, state of the materials (powder or dispersion), and types of blending machine and combination thereof. Various blending processes may be applied, including a process of premixing a flame retardant and the dripping inhibitor of the present invention, followed by placing the mixture and the resin in a kneading machine; and a process of blending the dripping inhibitor of the present invention with the thermoplastic resin which is at least partially in the form of an aqueous dispersion or organosol. The blending methods are not limited to these.

The resin compound of the present invention may optionally include known additives such as ultraviolet absorbers, antioxidants, pigments, molding aids, calcium carbonate, and glass fibers.

The dripping inhibitor of the present invention is a PTFE fine powder including a modified polytetrafluoroethylene and has an average particle size of 300 to 800 μm, an apparent density of 0.40 to 0.52 g/ml, a compression ratio of 1.20 or less, an aggregate disintegration degree with 50-sec vibration of 70% or more, a cylinder extrusion pressure at reduction ratio of 1500 of 80 MPa or less, and a standard specific gravity (SSG) of 2.140 to 2.230. The PTFE fine powder can give dust-generating property to a powder compound including a dust-generating powder. The PTFE fine powder, when combined with a powder compound including a dust-generating powder, exerts an anti-dusting property. Such a powder compound including the PFTE fine powder and a dust-generating powder is thus a powder compound with an anti-dusting property and has excellent handling characteristics and workability due to the presence of the PTFE fine powder.

Examples of the dust-generating powder include portland cement compounds which are used as soil improve agents as well as for various concrete structures; quicklime and slaked lime which are used as soil improvement agents; calcium silicate and calcium carbonate which are used as fertilizers; other dust-generating powders such as flyash, slag, ferrite, asphaltite, dust collection in steel furnaces, silica gel, alumina, pigments, carbonblack, talc, activated charcoal, flame retardants, and antimony oxides; and powder and granular wastes such as red mud and sludge.

In the powder compound, the amount of PTFE fine powder blended with a dust-generating powder is preferably 0.005 to 1.0 parts by weight, and more preferably 0.01 to 0.5 parts by weight for each 100 parts by weight of the dust-generating powder. If the amount of the PTFE fine powder is too small, the desired suppression effects of dust-producing may not be achieved. If the amount thereof is too large, the desired effect is saturated, which is not economically preferable.

EXAMPLES

The present invention will be described in more detail with reference to following examples which do not limit the present invention.

The data shown in examples were obtained according to the following measurement methods.

1. Average Particle Size of Secondary Particles of a PTFE Fine Powder (Dripping Inhibitor)

It was measured in conformity with JIS K6891.

2. Apparent Density

It was measured in conformity with JIS K6892.

3. Standard Specific Gravity (SSG)

It was measured in conformity with ASTM D 4895-89.

4. Paste Extrusion Pressure

A PTFE fine powder (dripping inhibitor, 50 g) and an extrusion aid, hydrocarbon oil (10.25 g, trade name: ISOPAR G, Exxon Mobil Corporation) were mixed in a glass bottle and aged at room temperature (25±2° C.) for 1 hour. The mixture was charged in an extrusion die (drawing angle: 30°, equipped with an orifice (diameter: 0.65 mm, length: 2 mm) on its lower end equipped with a cylinder (inner diameter: 25.4 mm). A load of 1.2 MPa was applied to a piston in the cylinder and maintained for 1 min, immediately followed by extrusion of the mixture from the orifice at room temperature at a ram speed of 20 ram/min to obtain a rod-shaped material. The pressure to the mixture is measured in a period in which the pressure is stable in the latter half of the extrusion. This pressure is divided by the cross-sectional area of the cylinder, and the obtained value is used as the extrusion pressure.

5. Compression Ratio

Figure 2:
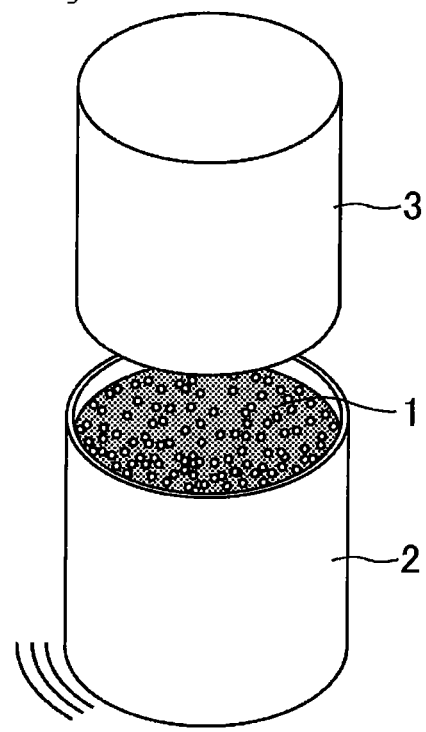
FIG. 2 shows another step in the measurement of the compression ratio and aggregate disintegration degree.
Figure 3:
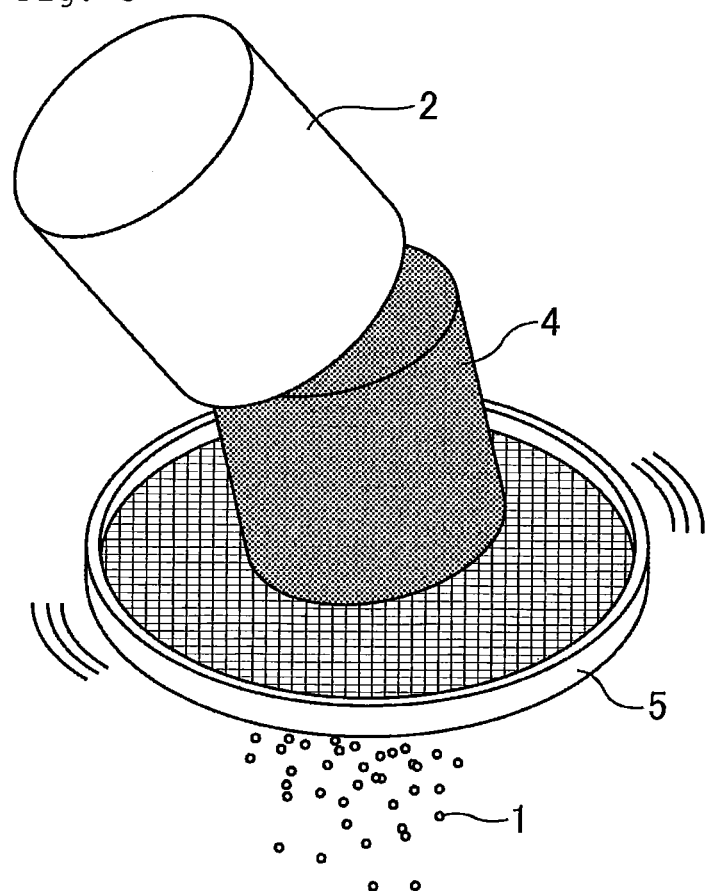
FIG. 3 shows still another step in the measurement of the compression ratio and aggregate disintegration degree.

The compression ratio was measured on a Powder Tester (Hosokawa Micron Corporation) at 25° C. FIGS. 1 to 3 give an overview of the measurement of the compression ratio. A round-shaped powder paper (diameter: 50 mm) was placed at the bottom of a SUS cylindrical cup 2 (inner diameter: 50 mm (measured value: 51.7 mm), volume: 150 ml). The inner side surface of the cup was also covered with a powder paper. The PTFE fine powder 1 (dripping inhibitor) was sieved with a 10-mesh sieve, and 50 g of the material passing through the sieve was sampled and placed in the cylindrical cup 2 as shown in FIG. 1. The surface of the powder was smoothened and covered with a round-shaped powder paper (diameter: 50 mm). As shown in FIG. 2, a weight 3 (a cylinder having a diameter of 50 mm, weight: 330 g) was placed on the powder paper, and was tapped for 20 times on the Powder Tester (tapping stroke: 20 mm). As shown in FIG. 3, a cylindrical cake 4 of the PTFE fine powder was taken out from the cylindrical cup 2 after tapping and the height thereof was measured with a caliper. The apparent density was calculated from the cross-section area and height of the cake. The compression ratio was calculated from the following equation:

$$(\text{Compression ratio}) = (\text{Apparent density of cake}) / (\text{Apparent density of PTFE fine powder})$$

The compression ratio is preferred to be closer to 1, which indicates that the fine powder is less cohesive and has superior handling characteristics.

6. Aggregate Disintegration Degree

The aggregate disintegration degree was measured at 25° C. The vibration strength was preliminarily adjusted so that the vibration scale of 5.5 corresponds to the amplitude of 1 mm. As shown in FIG. 3, the cylindrical cake 4 was placed on a 8-mesh sieve 5 and subjected to vibration on a Powder Tester (Hosokawa Micron Corporation) (vibration scale: 4.5). The mass of the PTFE fine powder 1 (dripping inhibitor) dropped due to vibration was measured every 5 seconds and the aggregate disintegration degree was calculated from the following equation:

$$(\text{Aggregate disintegration degree}) = (\text{Mass of PTFE fine powder passed through the sieve due to vibration}) / (\text{Total mass of PTFE fine powder}) \times 100 (\% \text{ by mass}).$$

The aggregate disintegration degree is preferred to be higher, which indicates that the powder is easily unraveled in binding and better in handling characteristics.

7. Modifier Content

The modifier content in a polymer (% by weight) was determined from infrared absorption spectral bands of a polymer sample.

Chlorotrifluoroethylene

The value obtained by multiplying 0.58 by the ratio of the absorption value at 957 cm$^{-1}$ (peak height) to the absorption value at 2360 cm$^{-1}$ Perfluoropropylvinylether The value obtained by multiplying 0.14 by the ratio of the absorption value at 995 cm$^{-1}$ to the absorption value at 935 cm$^{-1}$ Hexafluoroethylene The value obtained by multiplying 0.3 by the ratio of the absorption value at 983 cm$^{-1}$ to the absorption value at 935 cm$^{-1}$ Polymerization Example 1

PTFE latex was prepared in accordance with the method described in JP 2005-298581 A.

To a 6-L stainless steel (SUS316) autoclave equipped with a stainless steel (SUS316) anchor-type impeller and a thermostat jacket were added 3000 g deionized water, 120 g paraffin wax and 4.4 g ammonium perfluorooctanoate, and the autoclave was heated to 70° C. while removing oxygen from the system by purging three times with nitrogen gas and twice with TFE gas. The inner pressure was then brought to 0.70 MPa with TFE gas and the agitation speed of 280 rpm and the inner temperature of 70° C. were maintained.

After the temperature in the polymerization vessel was stabilized, 0.6 g hexafluoropropylene (HFP) as a modifying monomer for an initial stage of polymerization was pressed therein with TFE, followed by an aqueous solution of 18 mg ammonium persulfate in 20 g deionized water and an aqueous solution of 270 mg disuccinic acid peroxide in 20 g deionized water which were also pressed therein with TFE. The inner pressure of the autoclave was brought to 0.78 MPa. The reaction proceeded at an elevated rate, while the reaction temperature and agitation were maintained at 70° C. and 280 rpm, respectively. The inner pressure of the autoclave was always kept at 0.78 MPa with the continuous feed of TFE.

When 280 g of TFE was consumed in the reaction since addition of the polymerizaion initiator, agitation and feeding of TFE were once stopped, and gas in the autoclave was immediately released to ordinary pressure (release of TFE). Then, TFE was supplied until the inner pressure became 0.78 MPa and agitation was restarted at 280 rpm, whereby the reaction was continued.

When 1264 g of TFE was consumed since addition of the polymerizaion initiator, 5 g of HFP was added to the vessel as an additional modifying monomer, and the agitation speed was changed to 240 rpm to perform the reaction.

When 1400 g of TFE was consumed in the reaction since addition of the polymerizaion initiator, feeding of TFE was stopped, and gas in the autoclave was immediately released to ordinary pressure to terminate the reaction. The resulting PTFE aqueous dispersion had a solids content of 31.5% by weight, an average primary particle size of 0.25 μm, and a standard specific gravity (SSG) of 2.169, and the HFP modified amount in the polymer was 0.12% by weight.

Example 1

Deionized water was added to the PTFE aqueous dispersion obtained in Polymerization Example 1 to adjust the specific gravity to 1.080 g/ml (25° C.). To a 17-L stainless steel coagulation vessel equipped with a downward tapering cone-shaped impeller and a baffle plate was added 8.0 L of the PTFE aqueous dispersion whose specific gravity had been adjusted, and the temperature of the liquid was controlled to 22° C. Immediately after the adjustment of temperature, agitation at 600 rpm was initiated. After initiation of agitation, the aqueous dispersion underwent a change into a slurry and then a wet powder was formed. A previously prepared 1% aqueous solution of a nonionic surfactant, Laol XA-60-50 (46 g, Lion Corporation) was added to the coagulation vessel immediately before the wet powder was separated from water, and agitation was continued for 3 min.

The resulting wet polymer powder was then filtered off and was charged into the coagulation vessel the temperature of which was preliminarily adjusted to 40° C. along with 8.5 L of deionized water at 40° C. The polymer powder was washed twice at an agitation speed of 600 rpm. After washing, the wet polymer powder was filtered off, and left in a hot air circulation dryer at 210° C. for 18 hours to give a fine powder. The average particle size, apparent density, compression ratio and aggregate disintegration degree of the resulting fine powder (dripping inhibitor) were determined. The results are shown in Table 1.

Example 2

Fine powder was obtained in the same manner as in Example 1 except that the temperature of washing was changed to room temperature (25° C.). The average particle size, apparent density, compression ratio and aggregate disintegration degree of the resulting fine powder were determined in the same manner as in Example 1. The results are shown in Table 1.

Example 3

A fine powder was obtained in the same manner as in Example 1 except that the solution of a nonionic surfactant was not added in the process of coagulation of a wet powder and separation thereof from water, and that the temperature of washing was changed to room temperature (25° C.). The average particle size, apparent density, compression ratio and aggregate disintegration degree of the resulting fine powder were determined in the same manner as in Example 1. The results are shown in Table 1.

Comparative Example 1

A fine powder was obtained in the same manner as in Example 1 except that an anchor-type impeller was used instead of the downward tapering cone-shaped impeller, that the amount of the PTFE aqueous dispersion was changed to 7.0 L, that the conditions of coagulation and washing were changed according to Table 1, and that the solution of a nonionic surfactant was not added. The average particle size, apparent density, compression ratio and aggregate disintegration degree of the resulting fine powder were determined in the same manner as in Example 1. The results are shown in Table 1.

TABLE 1

|  | Example 1 | Example 2 | Example 3 | Comparative Example 1 |
|---|---|---|---|---|
| Starting aqueous dispersion | Polymerization Example 1 | Polymerization Example 1 | Polymerization Example 1 | Polymerization Example 1 |
| Impeller | Cone (downward) | Cone (downward) | Cone (downward) | Anchor |
| Adjusted specific gravity | 1.080 g/ml | 1.080 g/ml | 1.080 g/ml | 1.080 g/ml |
| Liquid volume | 8 L | 8 L | 8 L | 7 L |
| Coagulation temperature | 22° C. | 22° C. | 22° C. | 22° C. |
| Agitation speed | 600 rpm | 600 rpm | 600 rpm | 400 rpm |
| Surfactant added for coagulation | Laol XA-60-50 | Laol XA-60-50 | — | — |
| Concentration of surfactant added (vs. polymer) | 400 ppm | 400 ppm | — | — |
| Amount of 1% Laol aqueous solution added | 46 g | 46 g | — | — |
| Duration of agitation after water was repelled | 3 min. | 3 min. | 3 min. | 3 min. |
| Washing conditions — Temperature of washing water | 40° C. | 25° C. | 25° C. | 25° C. |
| Volume of deionized water | 8.5 L | 8.5 L | 8.5 L | 7 L |
| Rotational speed of agitation | 600 rpm | 600 rpm | 600 rpm | 400 rpm |
| Washing time | 1 min. | 1 min. | 1 min. | 1 min. |
| Washing frequency | 2 times | 2 times | 2 times | 2 times |
| Drying temperature | 210° C. | 210° C. | 210° C. | 210° C. |
| Apparent density (g/ml) | 0.493 | 0.500 | 0.493 | 0.473 |
| Average particle size (μm) | 450 | 470 | 480 | 470 |
| Height of cake (cm) | 4.255 | 4.06 | 4.13 | 4.15 |
| Apparent density of aggregate cake (g/ml) | 0.560 | 0.587 | 0.577 | 0.574 |
| Compression ratio | 1.14 | 1.17 | 1.17 | 1.21 |
| Extrusion pressure at RR1500 | 65 | 66 | 65 | 66 |

|  | Vibration time (sec) | (Mass of dripping inhibitor passed through the sieve)/(Total mass of dripping inhibitor) × 100(mass %) | | | |
|---|---|---|---|---|---|
| Aggregate disintegration degree | 0 | 0.0 | 0.0 | 0.0 | 0.0 |
|  | 5 | 20.4 | 20.8 | 16.4 | 2.4 |
|  | 10 | 31.4 | 30.2 | 31.6 | 11.8 |
|  | 15 | 46.0 | 43.8 | 43.6 | 18.6 |
|  | 20 | 57.4 | 54.4 | 51.0 | 23.8 |
|  | 25 | 65.0 | 61.8 | 57.4 | 28.6 |
|  | 30 | 69.8 | 67.0 | 61.6 | 34.6 |
|  | 40 | 76.4 | 73.0 | 68.4 | 44.2 |
|  | 50 | 81.6 | 79.0 | 73.2 | 51.2 |
|  | 60 | 85.4 | 82.0 | 77.2 | 57.6 |
|  | 70 | 88.0 | 85.0 | 80.4 | 62.2 |
|  | 80 | 90.0 | 88.0 | 82.6 | 68.2 |
|  | 90 | 91.6 | 89.6 | 84.4 | 72.8 |
|  | 100 | 92.6 | 91.6 | 86.0 | 76.8 |
|  | 110 | 93.6 | 92.8 | 87.6 | 79.6 |
|  | 120 | 94.4 | 93.8 | 88.6 | 82.0 |

Examples 4 to 6 and Comparative Example 2

Mixing of polycarbonate (PC)/PTFE and evaluation of angle of repose and aggregate disintegration degree of the mixed powder A polycarbonate (PC) resin powder (1840 g) and a fine powder (160 g) obtained in one of Examples 1 to 3 and Comparative Example 1 were preliminarily mixed by well shaking in a polyethylene bag. The mixture was charged into a Henschel mixer and mixed at an agitation speed of 500 rpm for 90 sec to give a mixed powder (resin compound) of PC/PTFE.

The angle of repose and aggregate disintegration degree of the resulting mixed powder of PC/PTFE were measured. The aggregate disintegration degree of the mixed powder of PC/PTFE was measured in the same manner as for the PTFE fine powder (dripping inhibitor) except that the number of tappings was changed to 50. The results are shown in Table 2. The angle of repose was measured at 25° C. by a Powder Tester of Hosokawa Micron Ltd.

TABLE 2

| Mixed powder of PC-PTFE | Mixed powder obtained in Example 4 | Mixed powder obtained in Example 5 | Mixed powder obtained in Example 6 | Mixed powder obtained in Comparative Example 2 | Mixed powder obtained in Example 4 | Mixed powder obtained in Comparative Example 2 |
|---|---|---|---|---|---|---|
| Mixed dripping inhibitor | Dripping inhibitor obtained in Example 1 | Dripping inhibitor obtained in Example 2 | Dripping inhibitor obtained in Example 3 | Dripping inhibitor obtained in Comparative Example 1 | Dripping inhibitor obtained in Example 1 | Dripping inhibitor obtained in Comparative Example 1 |
| Angle of repose | 42.1° | 43.3° | 44.0° | 46.2° |  |  |

TABLE 2-continued

|  | Vibration time (sec) | Temperature of powder at measurement | | | | | |
|---|---|---|---|---|---|---|---|
|  |  | 25° C. | 25° C. | 25° C. | 25° C. | 45° C. | 45° C. |
|  |  | (Mass of mixed powder of PC-PTFE passed through the sieve)/ (Total mass of mixed powder of PC-PTFE) × 100 (mass %) | | | | | |
| Aggregate disintegration degree | 0 | 0.0 | 0.0 | 0.0 | 0.0 | 0.0 | 0.0 |
|  | 5 | 19.6 | 20.0 | 15.8 | 14.2 | 12.0 | 9.4 |
|  | 10 | 30.6 | 30.2 | 22.4 | 23.4 | 22.8 | 15.4 |
|  | 15 | 38.2 | 36.6 | 27.6 | 28.6 | 27.2 | 19.0 |
|  | 20 | 45.2 | 40.8 | 32.8 | 34.0 | 30.2 | 23.6 |
|  | 25 | 52.6 | 44.2 | 38.6 | 38.4 | 32.8 | 26.6 |
|  | 30 | 59.6 | 54.2 | 42.8 | 43.4 | 36.0 | 29.6 |
|  | 40 | 74.0 | 61.8 | 49.4 | 47.6 | 42.0 | 33.0 |
|  | 50 | 82.2 | 67.6 | 53.8 | 50.8 | 48.4 | 35.0 |
|  | 60 | 87.2 | 76.0 | 58.0 | 54.6 | 53.0 | 36.8 |
|  | 70 | 91.0 | 80.0 | 64.0 | 56.8 | 56.8 | 38.4 |
|  | 80 | 95.2 | 81.2 | 67.8 | 58.4 | 61.4 | 40.0 |
|  | 90 | 96.6 | 84.0 | 70.6 | 59.6 | 64.0 | 41.8 |
|  | 100 | 98.4 | 87.2 | 73.2 | 60.8 | 69.0 | 43.0 |
|  | 110 | 99.0 | 88.6 | 77.0 | 62.4 | 77.0 | 44.2 |
|  | 120 | 99.0 | 90.2 | 80.8 | 63.4 | 81.8 | 47.8 |

Evaluation of Flame Retardance

Panlite L-1225W (PC resin, 6.63 kg, Teijin Chemicals Ltd.), Multilon T-3714 (PC/ABS resin, 1.58 kg, Teijin Chemicals Ltd.), PX-200 as a flame retardant (aromatic condensed phosphate ester, 1.3 kg, Daihachi Chemical Industry Co., Ltd.), and the mixed powder of PC/PTFE (0.5 kg) were premixed in a tumbler mixer. The mixture was extruded by a vented double-screw extruder having a diameter of 30 mm to produce pellets (kneading conditions: screw speed of 200 rpm, head temperature of 270° C., extrusion speed of 20 kg/h), and thus a flame-retardant resin compound was obtained. Strip specimens (thickness: 1/16 inches) were prepared by an injection molding machine (SG50, Sumitomo Heavy Industries, Ltd.) and evaluated for flame retardance in conformity of UL94 fire test. The results are shown in Table 3. The results in Table 3 show that the dripping inhibitors of Examples 1 to 3 have equivalent anti-dripping ability to that of Comparative Example 1.

TABLE 3

| Mixed powder of PC-PTFE | Mixed powder obtained in Example 4 | Mixed powder obtained in Example 5 | Mixed powder obtained in Example 6 | Mixed powder obtained in Comparative Example 2 |
|---|---|---|---|---|
| Mixed dripping inhibitor | Dripping inhibitor obtained in Example 1 | Dripping inhibitor obtained in Example 2 | Dripping inhibitor obtained in Example 3 | Dripping inhibitor obtained in Comparative Example 1 |
| Result of UL94 test | V-0 | V-0 | V-0 | V-0 |
| Number of specimens dripped | 0/10 | 0/10 | 0/10 | 0/10 |
| Combustion time (T1 + T2) | 20 | 19 | 19 | 20 |

INDUSTRIAL APPLICABILITY

The dripping inhibitor of the present invention is suitably used as a resin additive to improve characteristics of various resins. The flame-retardant resin compound of the present invention may be suitably used for consumer electronics, OA equipment, and products of the telecommunications field.

REFERENCE SIGNS LIST

1 Polytetrafluoroethylene fine powder
2 Cylindrical cup
3 Weight
4 Cylindrical cake of polytetrafluoroethylene fine powder
5 Sieve

The invention claimed is:

1. A dripping inhibitor comprising:
    a modified polytetrafluoroethylene,
    the inhibitor having an average particle size of 300 to 800 μm,
    an apparent density of 0.40 to 0.52 g/ml,
    a compression ratio of 1.20 or less,
    an aggregate disintegration degree with 50-sec vibration of 70% or more,
    a cylinder extrusion pressure at a reduction ratio of 1500 of 80 MPa or less, and
    a standard specific gravity (SSG) of 2.140 to 2.230,
    the modified polytetrafluoroethylene comprising tetrafluoroethylene and a modifying monomer other than tetrafluoroethylene,
    the modified polytetrafluoroethylene having a melting point of 325 to 347° C.,
    the modified polytetrafluoroethylene comprising 1% by mass or less of a modifying monomer unit relative to total monomer units therein, and
    the modifying monomer is selected from the group consisting of perfluoroolefins, chlorofluoroolefins, hydrogen-containing fluoroolefins, perfluorovinyl ethers, perfluoroalkyl ethylenes, and ethylene.

* * * * *